United States Patent [19]

Christie et al.

[11] Patent Number: 5,443,851
[45] Date of Patent: Aug. 22, 1995

[54] TEMPERATURE SENSITIVE VALVE FOR ATMOSPHERE CONTROL FOR FILM PACKAGED PRODUCTS

[75] Inventors: Gregor B. Y. Christie, Middle Park; David Wexler, Keiraville; Terence W. Turney, Mount Waverley, all of Australia

[73] Assignee: Commonwealth Scientific and Industrial Research Org., Australian Capitol Territory, Australia

[21] Appl. No.: 108,739

[22] PCT Filed: Feb. 27, 1992

[86] PCT No.: PCT/AU92/00080
§ 371 Date: Nov. 8, 1993
§ 102(e) Date: Nov. 8, 1993

[87] PCT Pub. No.: WO92/15499
PCT Pub. Date: Sep. 17, 1992

[30] Foreign Application Priority Data
Mar. 1, 1991 [AU] Australia ............... PK4881

[51] Int. Cl.[6] ............................................. A23B 7/148
[52] U.S. Cl. ............................... 426/88; 426/87; 426/118; 426/232; 426/395; 426/419; 383/103; 383/202; 137/72
[58] Field of Search ............... 426/87, 118, 419, 395, 426/232, 88; 383/206, 103, 202; 137/68.1, 72

[56] References Cited

U.S. PATENT DOCUMENTS

| | | | |
|---|---|---|---|
| 1,857,015 | 5/1932 | Gere | 426/118 X |
| 2,413,490 | 12/1946 | Evans | 137/72 |
| 3,799,427 | 3/1974 | Goglio | 383/103 |
| 4,842,875 | 6/1989 | Anderson | 426/118 X |
| 4,890,637 | 1/1990 | Lamparter | 426/118 X |
| 4,899,543 | 2/1990 | Romanelli et al. | 60/527 |
| 4,902,521 | 2/1990 | Rosenfeld | 426/118 X |
| 4,923,115 | 5/1990 | Sekoguchi et al. | 236/12.11 |

FOREIGN PATENT DOCUMENTS

| | | |
|---|---|---|
| 402040 | 4/1970 | Australia . |
| 32237/84 | 2/1986 | Australia . |
| 77085/87 | 3/1989 | Australia . |
| 75146/87 | 6/1989 | Australia . |
| 89/00643 | 6/1989 | United Kingdom . |
| 9202580 | 2/1992 | WIPO . |

*Primary Examiner*—Donald E. Czaja
*Assistant Examiner*—Milton I. Cano
*Attorney, Agent, or Firm*—Merchant, Gould, Smith, Edell, Welter & Schmidt

[57] ABSTRACT

Packaging apparatus and method, for use in controlled atmosphere packaging of horticultural produce in controlled permeability film. A valve apparatus mounted on or in a packaging film including a temperature sensitive sensor formed from a bimetallic or shape-memory material (2), or a chemical sensitive sensor formed from a swellable polymer, to actuate the valve member (pin or plug) (1) on, or in communication with the sensor. In use, after sealing the produce within the packaging film, the valve apparatus opens the packaging film in response to a temperature change of predetermined magnitude to allow oxygen flow for extension of storage life or fumigation of the produce.

10 Claims, 1 Drawing Sheet

TEMPERATURE SENSITIVE VALVE FOR ATMOSPHERE CONTROL FOR FILM PACKAGED PRODUCTS

FIELD OF THE INVENTION

The present invention relates to packaging apparatus including apparatus for use in controlled atmosphere packaging and to the protective packaging of sensitive produce therewith.

BACKGROUND OF THE INVENTION

Control of carbon dioxide ($CO_2$) and oxygen ($O_2$) concentration around produce has been shown in the prior art to increase the storage life thereof. Control of water vapor concentration is also important. Conditions for the optimal storage of horticultural commodities are influenced by factors which include crop species, cultivar, growing conditions, maturity, quality, temperature, relative humidity, packaging, and storage duration. Storage under controlled and modified atmosphere is influenced by the concentration of oxygen, carbon dioxide, ethylene, water vapour and other gases. Controlled atmosphere (CA) storage is achieved by externally supplying a gas stream of the required $O_2$ and $CO_2$ concentration into the storage cold room. Controlled atmosphere packaging achieves extended produce life because of effects such as slowing respiration and inhibiting pathogen growth.

It is also known in the prior art that $CO_2$ and $O_2$ atmospheres surrounding produce can be modified by utilising the respiration behaviour of the produce where $O_2$ is converted to $CO_2$. With modified atmosphere (MA) packaging, produce is stored in polymeric film where the film permeability is exactly matched to the expected respiration behaviour as influenced by temperature and atmosphere changes to provide the optimum $CO_2$ and $O_2$ atmosphere.

A controlled permeability film, disclosed in International Patent Application PCT/AU91/00346, to applicants, the entire disclosure of which is incorporated herein by reference, has proved partially successful in alleviating some of the difficulties related to the prior art. However, the $CO_2$–$O_2$ balance is significantly influenced by changes in ambient temperature. For example such a film may be designated to operate over a certain temperature range (e.g. 0°–5° C.) in cool stores. If the temperature of the package exceeds an upper limit (e.g. 10°–15° C.) for an extended period of time, the respiration rate of the produce becomes too high for external $O_2$ to permeate through the film at a sufficient rate. The produce then respires anaerobically and soon dies.

It is also known in the prior art to rupture packaging in order to permit fumigation thereof as part of disease control and in order to satisfy import requirements in certain countries. However, the packaging rupture must be handled manually and is a time-consuming and thus expensive exercise.

Accordingly it is an object of the present invention to overcome, or at least alleviate, one or more of the difficulties related to the prior art.

SUMMARY OF THE INVENTION

Accordingly in a first aspect of the present invention there is provided a valve apparatus including
a temperature- or chemical- sensitive sensor including an actuating member controlled by the sensor; and
a valve member on, or in communication with the sensor.

The valve apparatus will be more fully described with reference to its application in controlled atmosphere packaging. However this is illustrative only and the valve apparatus may be utilised in numerous other applications including fumigation as discussed below.

The valve apparatus according to this aspect of the present invention may function in use as follows: the sensor in the valve apparatus monitors the environment of the packaging film. When a change in temperature, or chemical composition of the environment is detected the valve apparatus is activated and a small puncture made or a small orifice opened in the packaging film surface. This immediately alters the internal environment and reduces the risk of spoilage.

For example, an increase in temperature which may lead to spoilage may be detected by a temperature-sensitive sensor directly, or a chemical-sensitive sensor may detect the chemical change in the atmosphere generated by the increase in temperature.

The actuating member is then activated and drives the valve member to open the film sufficiently to allow entry of external atmosphere.

The valve apparatus may be of any suitable type. The valve apparatus may be reusable or designed for once-only operation. The valve apparatus may be resealable.

The temperature- or chemical- sensitive sensor may be of any suitable type. Where a temperature-sensitive sensor is used, the sensor may be formed from a bimetallic material or shape-memory material. The shape-memory material may be a shape memory alloy. A nickel-titanium alloy is preferred. The nickel-titanium alloy may be selected from those sold under the trade designations Kiokalloy, available from Daido Steel, Memoalloy, available from Tokin and Furukawa NT available from Furukawa Electric.

In an alternative aspect of the present invention, where a chemical sensor is used, the sensor may monitor the presence, or concentration of various chemicals including Oxygen ($O_2$), Carbon dioxide ($CO_2$), Methane ($CH_4$), or Methanol ($CH_3OH$) or Ethanol $CH_3CH_2OH$.

Where a chemical-sensitive material is used, the sensor may be directly or indirectly atmosphere-sensitive. The chemical-sensitive material may be sensitive to ethanol or like by-products of anaerobic respiration. For example, the sensor may be formed from a swellable material or blend thereof, for example a swellable polymer. A cellulose material such as cellulose acetate may be used. In use, the cellulose acetate swells in the presence of ethanol. A valve member may be positioned under tension against the sensor. When the sensor weakens the valve member breaks through.

In certain embodiments, the temperature-sensitive sensor may function as both sensor and actuating member. The sensor may be mounted under tension. When a temperature change is detected this will cause movement of the bimetallic or shape-memory material. A shape-memory material is preferred .as it may be made to react rapidly and with significant force over a narrow temperature range.

The valve member may be of any suitable type. The valve member may comprise a puncture member. A pin or hollow needle may be used. Alternatively, the valve member may function as a plug. In use in this form, the packaging film is opened by removal of the valve member from an orifice sealed by the valve member. The valve member may be attached directly to the sensor.

Accordingly in a preferred aspect of the present invention there is provided a temperature sensitive valve apparatus including a base member adapted for attachment to a packaging film;

a temperature-sensitive sensor formed from a bimetallic or shape-memory material mounted on the base member; and a valve member attached to the sensor.

The base member may include a plastic adhesive.

The base member may include a resealable portion such that in use the valve apparatus will reseal once the valve member is withdrawn. Where the valve member is a puncture member, the resealable portion may be formed from a septum-like material.

In a further preferred aspect of the present invention there is provided a temperature-sensitive valve apparatus including a base member including a top face and a bottom face;

a conduit extending through the base member below the bottom face of the base member;

a temperature-sensitive sensor formed from a bimetallic or shape-memory material mounted under tension on the base member; and a valve member attached to the sensor which, within a predetermined normal temperature range, seals the conduit.

The conduit in the base member may include a hollow needle. It will be understood, in this form, the valve apparatus may simply be mounted onto the packaging film via the hollow needle. The hollow needle may, in addition, include a sealing ring or like member.

In use, the valve member seals the conduit in the base member. In response to a rise in temperature beyond the predetermined range, the temperature-sensitive sensor moves and this opens the valve. The valve apparatus is designed to function in any suitable range. Preferably the temperature range extends from 0° to approximately 15° C., preferably 0° to approximately 10° C.

The temperature sensitive sensor may take the form of a strip or cap mounted on the base member.

In a preferred aspect, the present invention provides a packaging apparatus including a packaging film; and a valve apparatus mounted on the packaging film, and including a temperature- or chemical- sensitive sensor including an actuating member controlled by the sensor; and a valve member on, or in communcation with the sensor.

The packaging film may be formed from any suitable film forming polymer. The film forming polymer may be of any suitable type. The film forming polymer may be selected from polyolefins including polyethylene and polypropylene, polyesters including polyethylene terephthalate and polybutylene terephthalate, vinyl polymers including polyvinyl chloride, polyvinyl acetate, ethylene-vinyl acetate copolymers and ethylene-vinyl alcohol copolymers, polycarbonates and polystyrenes polyalkylene oxide polymers, including polyethylene oxide polymer; and blends of any of the above. Preferably the film forming polymer is a polyolefin more preferably polyethylene. A low density polyethylene is particularly preferred. A linear low density polyethylene has been found to be suitable.

The packaging film of the controlled atmosphere packaging may be a controlled permeability film. The controlled permeability film may include an effective amount of a film forming polymer; and an inert porous filler in an amount effective to reduce the ratio of carbon dioxide permeability to the oxygen permeability of the filler; and wherein the filler has a particle size greater than the intrinsic film thickness of the film forming polymer.

The inert porous filler may be of any suitable type. A mineral filler is preferred.

In a preferred aspect of the present invention the controlled atmosphere packaging film may be utilised in the packaging of produce including highly sensitive produce such as broccoli.

Accordingly in a preferred form there is provided a packaged produce product including a packaging apparatus including a packaging film; and a valve apparatus mounted on or in the packaging film, including a temperature- or chemical- sensitive sensor including an actuating member controlled by the sensor; and a valve member on, or in communcation with the sensor; and a produce product packaged therein.

The produce product may be of any suitable type sensitive to oxygen deterioration. The produce may be selected from Broccoli, Brussels Sprouts, Beans, Cabbage, Chicory, Celery, Cauliflower, Radish, Artichoke, Lettuce, Tomato, Pepper, Leeks, Parsley, Spinach, Asparagus, Mushroom, Okra, flowers, berries, cherry, melons, mango, papaya, pineapple, avocado, persimmon, grapefruit, kiwifruit, nectarine, peach, apple, banana, orange, apricot, grape, cranberry, plum, pear and nashi.

Preferably the packaged produce product includes a controlled permeability packaging film including an effective amount of a film forming polymer; and an inert porous filler in an amount effective to reduce the ratio of carbon dioxide permeability to the oxygen permeability of the filler; and wherein the filler has a particle size greater than the intrinsic film thickness of the film forming polymer; and a temperature-sensitive valve apparatus mounted on or in the packaging film including a base member including a top face and a bottom face;

a conduit extending through the base member below the bottom face of the base member;

a temperature-sensitive sensor formed from a bimetallic or shape-memory material mounted under tension on the base member; and a valve member attached to the sensor which, within a predetermined normal temperature range, seals the conduit; and a produce product packaged therein.

The preferred packaged produce product has been found to exhibit improved $CO_2$/oxygen permeability such that the deterioration of the produce product is significantly reduced. However, an inadvertent temperature rise may occur, e.g. due to mechanical or electrical break down, which will render the controlled permeability film incapable of compensating for the increased output of $CO_2$ or consumption of $O_2$ within the package. The temperature or chemical sensor detects the rise in temperature activating the actuating member and opening the package. It will be understood that a puncture the size of a pin hole in the film dramatically affects the $CO_2/O_2$ balance and reduces the risk of spoilage.

Accordingly, in a preferred aspect of the present invention there is provided a method for the extension of storage life of produce which method includes
providing
a produce product; and
a packaging apparatus including
a packaging film; and
a valve apparatus mounted on or in the packaging film including
a temperature- or chemical-sensitive sensor including an actuating member controlled by the sensor; and
a valve member on, or in communcation with the sensor;
sealing the produce product within the packaging film such that, in use, the valve apparatus opens the packaging film in response to a temperature change of predetermined magnitude.

As described above, the packaging apparatus is normally designed for utilisation at temperatures of 0° to approximately 5° C. and the valve apparatus may actuate above 10° C. to 15° C.. A temperature increase of, for example, approximately 5° C. to 10° C. or greater may be sufficient to generate unacceptably high levels of $CO_2$ or unacceptably low levels which will threaten spoilage of the produce product.

Whilst the valve apparatus has been described for use in extending produce life via increased oxygen flow, the valve apparatus may be utilised in alternative or additional applications. For example, a preservative may be introduced alternatively or in addition to, increased oxygen flow. Alternatively, temperatures may be deliberately raised in order to puncture the packaging film. This may be necessary for fumigation purposes for example.

Accordingly in a still further embodiment of the present invention there is provided
a packaging apparatus including a packaging film; and
a valve apparatus mounted on or in the packaging film including
a temperature- or chemical- sensitive sensor including an actuating member controlled by the sensor;
a valve member on, or in communication with the sensor; and
a supply of a fumigating and/or preservative agent in a suitable container, in communication with the valve member.

The fumigant and/or preservative container may be a canister or like container. The container may be attached directly or indirectly to the valve member.

The fumigating agent may be of any suitable type. Ethylene oxide or methyl bromide may be used as fumigating agents.

Where a preservative agent is used, sulphur dioxide ($SO_2$—) has been found to be suitable.

Preferably the valve member includes aperture member.

DETAILED DESCRIPTION OF THE INVENTION

Figure 1:
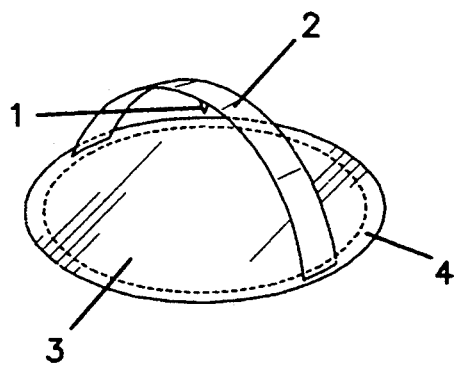
FIG. 1 illustrates a first embodiment of a valve apparatus according to the present invention.

The present invention will now be more fully described with reference to the accompanying drawings and examples. It should be understood, however, that the description following is illustrative only and should not be taken in any way as a restriction on the generality of the invention described above.

In the drawings, FIGS. 1 to 5 illustrate a number of embodiments of the valve apparatus according to the present invention.

FIG. 1 illustrates an embodiment of a valve apparatus in which a valve member in the form of a pin 1 is mounted on a temperature-sensitive bimetallic or shape memory sensor strip 2 which is in turn mounted under tension on a base member 3. The base 3 is provided with an adhesive rim 4 for attachment to a packaging film (not shown). In use, in response to a predetermined temperature rise, the temperature-sensitive sensor strip 2 flexes and drives the valve member in the form of a pin 1 through the base 3 to puncture the packaging film.

Figure 2:
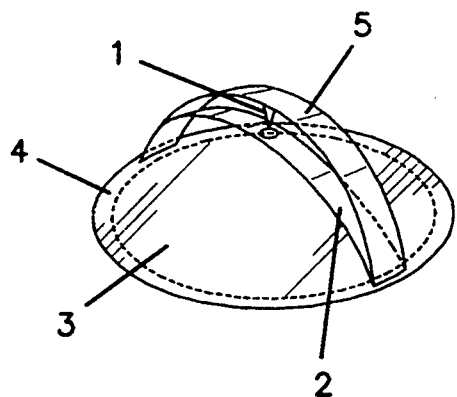
FIG. 2 illustrates a second embodiment of a valve apparatus according to the present invention.

FIG. 2 illustrates a similar embodiment to that illustrated in FIG. 1 except that the rupturing pin 1 is mounted on a flexible plastic strip 5 above the sensor strip 2.

Figure 3:
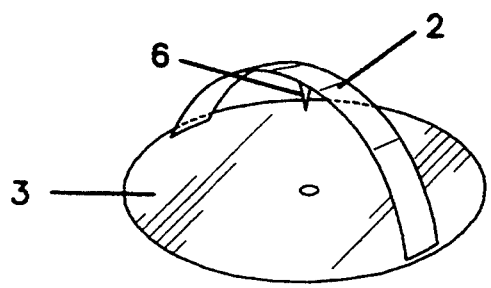
FIG. 3 illustrates a third embodiment of a valve apparatus according to the present invention.

FIG. 3 illustrates a reversible valve apparatus in which the temperature-sensitive sensor strip 2 may flex both downwardly and upwardly in response to a rise and drop in temperature respectively. The valve member 6 is of the needle type permitting air flow therethrough. The base 3 is formed of a septum-like material which will not rupture when punctured and will reseal when the valve 6 is removed.

Figure 4:
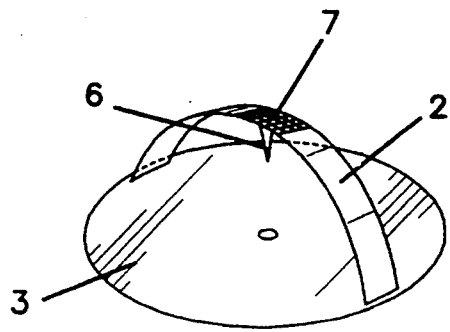
FIG. 4 illustrates a fourth embodiment of a valve apparatus according to the present invention.

FIG. 4 illustrates a similar embodiment to that illustrated in FIG. 3 except that the temperature-sensitive sensor strip 2 includes a controlled permeability section 7 in communication with the needle-type valve member 6. In this embodiment, the level of gas release may be further controlled during puncture.

Figure 5:
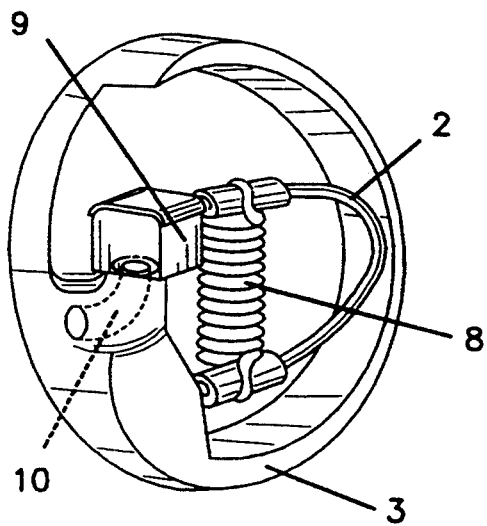
FIG. 5 illustrates a fifth embodiment of a valve apparatus according to the present invention.

FIG. 5 illustrates an alternative embodiment of a valve apparatus in which the valve member 9 is mounted on a temperature-sensitive shape memory sensor strip 2 and which is in turn mounted on base member 3 and bent via coil spring 8. The base 3 includes a conduit in the form of a hollow needle 10 sealed at one end by the valve member 8. In use, in response to a predetermined temperature rise, the temperature-sensitive sensor strip 2 flexes and releases the valve member 9 thus opening the conduit 10. The internal diameter of the conduit may be adjusted depending on the extent of temperature rise anticipated. Larger diameters may be required where greater temperature rises, e.g. of 20° C. or greater may occur.

EXAMPLE 1

A temperature-sensitive valve apparatus (TSVA) of the type shown in FIG. 5 was constructed. The base member was a cylindrical disk, formed by casting epoxy resin. The base of the disk designed to be attached to the packaging film was flat, and contained the open end of the conduit. The other end of the disk held the shape memory sensor strip, valve member, sealing end of the conduit optionally enclosed a cylindrical plastic cap.

The temperature sensitive shape memory sensor strip comprised a length of heat-treated nickel-titanium shape-memory wire, bent into an open loop by a small tension spring located on the inside of the loop. The Cr-doped Ni-Ti shape memory wire (0.2 wt. % Cr) was heat treated for 5 minutes at 500° C. and then air cooled. The ends of the loop formed a gap which varied with changes in temperature. (Over the temperature range, −5° to 20° C., the gap decreased by approximately 0.2 mm for each 1° C. drop in temperature). The gap may also be varied (and set) by sliding the ends of the spring toward or away from the open ends of the loop.

The valve member included a soft elastomer pad on a backing of stainless steel shim. It was attached to the free end of the wire loop. The conduit included a tubular section approximately 3 mm outer diameter and 2 mm inner diameter passing through the base member. The conduit was polished and shaped to form a flat seal with the elastomer pad when the valve was closed.

EXAMPLE 2

Two bags were constructed from a controlled permeability polyethylene film, produced containing 0.25% porous additive, scoria, as disclosed in International Patent Application PCT/AU91/00346. The oxygen permeability of the film at 0° C. was $2.9 \times 10^{-15}$ mole/sec m Pa and at 20° C. was $4.4 \times 10^{-15}$ mole/sec m Pa. The ratio of carbon dioxide to oxygen permeability was 1:8 at 0° and 20° C.

A TSVA, which was open at 20° C., was attached to one of the bags via double sided tape. A hole 2 mm diameter, which extended into the base of the conduit was pierced in the bag, and the seal between the packaging film and the flat side of the base member was checked for air tightness. Three kg of peaches (cultivar Tatura 212) were placed in each bag at 20° C. Each bag was heat sealed to provide 0.38 m² of controlled permeability film.

The sealed bags were then cooled to 0° C. overnight and the atmosphere in both bags equilibrated to 3.0% oxygen and 10% carbon dioxide. A similar modified atmosphere was measured in both bags and indicated that the TSVA must have closed.

The bags were then removed from the cool room and allowed to warm up to 20° C. The $O_2$ concentration of the bag without the TSVA dropped to 0.3% indicating anaerobic conditions within the bag. The $O_2$ concentration in the bag with the TSVA decreased to 1.8% indicating that an aerobic modified atmosphere was maintained within the bag and that the TSVA must have opened.

The temperature was then lowered to 14° C. The concentration of $O_2$ in both bags changed to the same value (0.6%), indicating that the TSVA had re-closed.

Finally, it is to be understood that various other modifications and/or alterations may be made without departing from the spirit of the present invention as outlined herein.

We claim:

1. A packaging apparatus comprising:
    (a) a packaging film; and,
    (b) a valve apparatus mounted on or in the packaging film, and comprising:
        (i) a base member for attaching the valve apparatus to the packaging film;
        (ii) a temperature-sensitive sensor including an actuating member controlled by the sensor; and,
        (iii) a valve member on, or in communication with the sensor.

2. A packaging apparatus according to claim 1, wherein the valve member includes means for puncturing at least a package and packaging film; and the base member includes a resealable portion such that in use the valve apparatus will reseal once the valve member is withdrawn.

3. A packaging apparatus according to claim 1, wherein the temperature-sensitive sensor is formed from a bimetallic or shape-memory material.

4. A packaging apparatus according to claim 1, wherein the packaging film includes a controlled permeability film comprising:
    (a) an effective amount of a film forming polymer; and,
    (b) an inert porous filler in an amount effective to reduce the ratio of carbon dioxide permeability to the oxygen permeability of the filler; and wherein the filler has a particle size greater than the intrinsic film thickness of the film forming polymer.

5. A packaged produce product comprising:
    (a) a packaging apparatus comprising;
        (i) a packaging film; and,
        (ii) a valve apparatus mounted on or in the packaging film, including:
            (A) a base member for attaching the valve apparatus to the packaging film;
            (B) a temperature-sensitive sensor including an actuating member controlled by the sensor; and,
            (C) a valve member on, or in communication with the sensor; and,
        (iii) a produce product packaged therein.

6. A packaged product comprising:
    (a) a packaging apparatus:
        (i) a controlled permeability packaging film including; an effective amount of a film forming polymer; and, an inert porous filler in an amount effective to reduce the ratio of carbon dioxide permeability to the oxygen permeability of the filler; and wherein the filler has a particle size greater than the intrinsic film thickness of the film forming polymer;
    (b) a temperature-sensitive valve apparatus mounted on or in the packaging film, including a base member including a top face and a bottom face;
    (c) a conduit extending through the base member below the bottom face of the base member;
    (d) a temperature-sensitive sensor formed from a bimetallic or shape-memory material mounted under tension on the base member;
    (e) a valve member located in the conduit and attached to the sensor which, within a predetermined normal temperature range, seals the conduit; and,
    (f) a produce product packaged therein.

7. A packaged produce product according to claim 6, wherein the produce is selected from Broccoli, Brussels Sprouts, Beans, Cabbage, Chicory, Celery, Cauliflower, Radish, Artichoke, Lettuce, Tomato, Pepper, Leeks, Parsley, Spinach, Asparagus, Mushroom, Okra, flowers, berries, cherry, melons, mango, papaya, pineapple, avocado, persimmon, grapefruit, kiwifruit, nectarine, peach, apple, banana, orange, apricot, grape, cranberry, plum, pear and nashi.

8. A packaging apparatus including:

(a) a packaging film;
(b) a valve apparatus mounted on or in the packaging film including:
  (i) a temperature-sensitive sensor including an actuating member controlled by the sensor; and,
  (ii) a valve member on, or in communication with the sensor; and,
(c) a supply of a fumigating and preservative agent in a suitable container, in communication with the valve member.

9. A method for the extension of storage life of produce which method comprises:
(a) providing:
  (i) a produce product; and,
  (ii) a packaging apparatus including:
    (A) a packaging film; and,
    (B) a valve apparatus mounted on or in the packaging film including;
      (i) a temperature-sensitive sensor including an actuating member controlled by the sensor; and,
      (ii) a valve member on, or in communication with the sensor; and,
(b) sealing the produce product within the packaging film such that, in use, the valve apparatus opens the packaging film in response to a temperature change of predetermined magnitude.

10. A method according to claim 9, wherein the valve apparatus comprises:
(a) a base member including a top face and a bottom face;
(b) a conduit extending through the base member below the bottom face of the base member;
(c) a temperature-sensitive sensor formed from a bi-metallic or shape-memory material mounted under tension on the base member; and,
(d) a valve member located in the conduit and attached to the sensor which, within a predetermined normal temperature range, seals the conduit.

* * * * *

UNITED STATES PATENT AND TRADEMARK OFFICE
CERTIFICATE OF CORRECTION

PATENT NO. : 5,443,851

DATED : August 22, 1995

INVENTOR(S) : Christie, et al.

It is certified that error appears in the above-identified patent and that said Letters Patent is hereby corrected as shown below:

In column 2, line 59, delete "." after the word "preferred".

Signed and Sealed this

Twenty-fourth Day of September, 1996

*Attest:*

BRUCE LEHMAN

*Attesting Officer*   *Commissioner of Patents and Trademarks*